（12) United States Patent
Bansal et al.

(10) Patent No.: US 9,110,777 B2
(45) Date of Patent: Aug. 18, 2015

(54) REDUCING PERFORMANCE DEGRADATION IN BACKUP SEMICONDUCTOR CHIPS

(75) Inventors: Aditya Bansal, White Plains, NY (US); Manjul Bhushan, Hopewell Junction, NY (US); Keith A. Jenkins, Sleepy Hollow, NY (US); Jae-Joon Kim, Yorktown Heights, NY (US); Barry P. Linder, Hastings-on-Hudson, NY (US); Kai Zhao, Hopewell junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 516 days.

(21) Appl. No.: 13/396,345

(22) Filed: Feb. 14, 2012

(65) Prior Publication Data

US 2013/0212414 A1    Aug. 15, 2013

(51) Int. Cl.
| G06F 1/26 | (2006.01) |
| G06F 11/00 | (2006.01) |
| H04M 15/00 | (2006.01) |
| G06F 1/20 | (2006.01) |
| G06F 1/32 | (2006.01) |
| G06F 17/50 | (2006.01) |
| G06F 11/20 | (2006.01) |

(52) U.S. Cl.
CPC ............. *G06F 11/004* (2013.01); *G06F 1/206* (2013.01); *G06F 1/3293* (2013.01); *G06F 11/00* (2013.01); *G06F 17/505* (2013.01); *H04M 15/00* (2013.01); *G06F 11/2041* (2013.01); *G06F 11/2043* (2013.01); *G06F 2217/70* (2013.01); *G06F 2217/72* (2013.01); *G06F 2217/80* (2013.01); *Y02B 60/121* (2013.01); *Y02B 60/1275* (2013.01)

(58) Field of Classification Search
CPC ............................. H04M 15/00; G06F 11/00
USPC ............................................. 714/13; 713/320
See application file for complete search history.

(56) References Cited

U.S. PATENT DOCUMENTS

| 5,451,892 | A | 9/1995 | Bailey | |
| 6,512,209 | B1 | 1/2003 | Yano | |
| 7,504,891 | B1 * | 3/2009 | Liu | 331/16 |
| 7,809,984 | B2 | 10/2010 | Vaidyanathan | |
| 7,861,113 | B2 | 12/2010 | Wang | |
| 2007/0283190 | A1 * | 12/2007 | Reblewski | 714/30 |
| 2008/0091974 | A1 | 4/2008 | Nakashima | |
| 2009/0094481 | A1 | 4/2009 | Vera | |
| 2009/0249094 | A1 * | 10/2009 | Marshall et al. | 713/320 |
| 2010/0241809 | A1 * | 9/2010 | Ageishi | 711/130 |
| 2011/0022868 | A1 * | 1/2011 | Harchol-Balter et al. | 713/323 |

OTHER PUBLICATIONS

IBM "Method and Apparatus for Power Management in Multi-Core, Multi-Chip Processors Using Automatic Frequency and Supply Voltage Control", IP.com, IPCOM000190350D, Nov. 2009.
Srinivasan Murali, et al. "Temperature-Aware Processor Frequency Assignment for MPSoCs Using Convex Optimization". CODES+ISSS'07, Sep. 30-Oct. 3, 2007, Salzburg, Austria.
Ranjani Sridharan,et al. "Reliability Aware Power Management for Dual-Processor Real-Time Embedded Systems". DAC'10, Jun. 13-18, 2010, Anaheim, California, USA.
Kyriakos Stavrou, et al. "Thermal-Aware Scheduling for Future Chip Multiprocessors". EURASIP Journal on Embedded Systems, vol. 2007, Article ID 48926.
Yefu Wang, "Temperature-Constrained Power Control for Chip Multiprocessors with Online Model Estimation". ISCA'09, Jun. 20-24, 2009, Austin, Texas, USA.

* cited by examiner

*Primary Examiner* — Thomas Lee
*Assistant Examiner* — Zhipeng Wang
(74) *Attorney, Agent, or Firm* — Preston J. Young; Otterstedt, Ellenbogen & Kammer, LLP

(57) ABSTRACT

A system has at least a first circuit portion and a second circuit portion. The first circuit portion is operated at normal AC frequency. The second circuit portion is operated in a back-up mode at low AC frequency, such that the second circuit portion can rapidly come-online but has limited temperature bias instability degradation. The second circuit portion can then be brought on-line and operated at the normal AC frequency. A system including first and second circuit portions and a control unit, as well as a computer program product, are also provided.

14 Claims, 6 Drawing Sheets

NBTI STRESS CONDITION

PBTI STRESS CONDITION

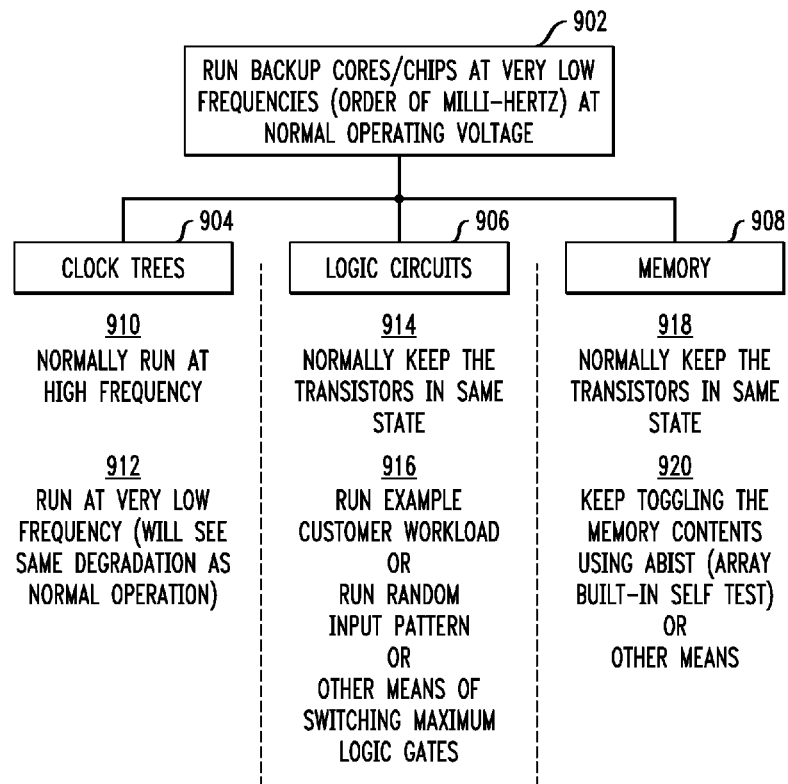
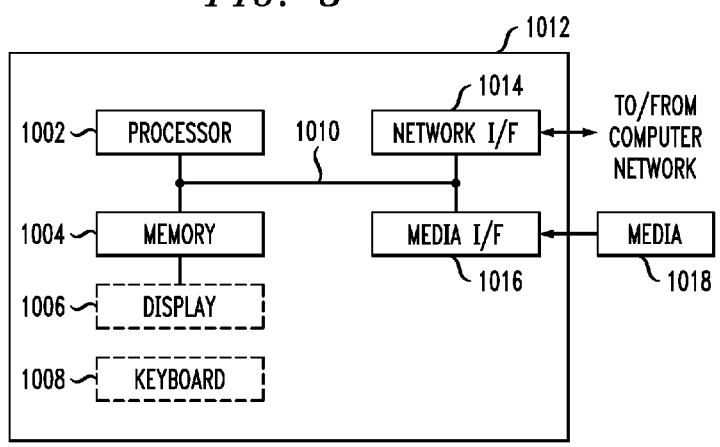
FIG. 8

REDUCING PERFORMANCE DEGRADATION IN BACKUP SEMICONDUCTOR CHIPS

FIELD OF THE INVENTION

The present invention relates to the electrical and electronic arts, and, more particularly, to techniques for addressing negative bias temperature instability (NBTI) and/or positive bias temperature instability (PBTI) and the like.

BACKGROUND OF THE INVENTION

In server systems, there are backup chips (or in multi-core processors, backup cores) that are continuously powered on. These backup chips and cores are ready to start computation if the initial working chip or core, as the case may be, experiences errors due to hardware failure or single event upsets, and/or if there is a spike in workload. Hence, they cannot be powered off while not being used, as latency time to bring them up can be quite large (several million clock cycles) compared to the expected response time of a few clock cycles. Even though the backup chips are powered on, they are not operating, as this would result in a large amount of wasted power consumption. Furthermore, they are also experiencing temperatures typical of the entire system. Hence, these backup chips, cores, and/or circuits are degraded by NBTI and PBTI mechanisms since they are powered on at high temperature.

FIG. 1 shows a p-type MOSFET 1100 with a grounded gate and the left-hand drain-source terminal at voltage VDD, i.e., an NBTI stress condition. FIG. 2 shows an n-type MOSFET 1200 with gate at voltage VDD and the left-hand drain-source terminal grounded, i.e., a PBTI stress condition. NBTI leads to an increase in absolute value of PMOS threshold voltage (Vt) and PBTI leads to an increase in absolute value of NMOS threshold voltage (Vt). Increase in threshold-voltage is also referred to as degradation because performance of a MOSFET is reduced thereby.

SUMMARY OF THE INVENTION

Principles of the invention provide techniques for reducing performance degradation in backup semiconductor chips (or backup circuits on a single chip). In one aspect, an exemplary system includes a first circuit portion; a second circuit portion; and a control unit configured to cause the first circuit portion to operate at normal AC frequency; and cause the second circuit portion to operate in a back-up mode at low AC frequency, such that the second circuit portion can rapidly come-online but has limited temperature bias instability degradation.

In another aspect, an exemplary method of operating a system having at least a first circuit portion and a second circuit portion includes the steps of operating the first circuit portion at normal AC frequency; and operating the second circuit portion in a back-up mode at low AC frequency, such that the second circuit portion can rapidly come-online but has limited temperature bias instability degradation.

In still another aspect, design structures directed to circuits of the kind described and/or portions thereof are provided.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the present invention may be realized in the form of an integrated circuit.

One or more embodiments of the invention or elements thereof (for example, control software) can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

BRIEF DESCRIPTION OF THE DRAWINGS

FIG. 7 compares traditional modes of operation with exemplary modes of operation in accordance with aspects of the invention;

FIG. 8 depicts a computer system that may be useful in implementing one or more aspects and/or elements of the invention.

DETAILED DESCRIPTION OF PREFERRED EMBODIMENTS

Figure 1:
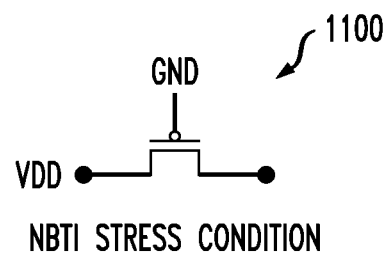
FIG. 1 shows an NBTI stress condition, as known in the prior art.
Figure 2:
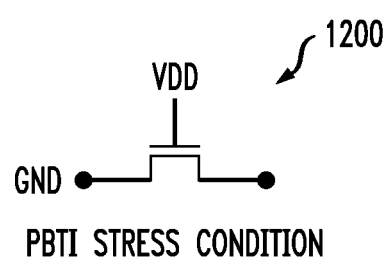
FIG. 2 shows a PBTI stress condition, as known in the prior art.

As noted, in server systems, there are backup chips (or in multi-core processors, backup cores) that are continuously powered on. These backup chips and cores are ready to start computation if the initial working chip or core, as the case may be, experiences errors due to hardware failure or single event upsets, and/or if there is a spike in workload. Hence, they cannot be powered off while not being used, as latency time to bring them up can be quiet large (several million clock cycles) compared to the expected response time of a few clock cycles. Even though the backup chips are powered on, they are not operating, as this would result in a large amount of wasted power consumption. Furthermore, they are also experiencing temperatures typical of the entire system. Hence, these backup chips, cores, and/or circuits are degraded by NBTI and PBTI mechanisms since they are powered on at high temperature.

In this static power on mode, transistors see very large degradation compared to normal switching mode because NBTI and/or PBTI cause degradation while a transistor is on and recovery when it is off (i.e., the worst degradation from BTI is typically expected for DC voltage with no switching). Furthermore, different chips are set to operate at different voltages in order to achieve the same performance, and hence, some chips may experience more degradation than others. Thus the backup chip is degrading, and it might not be operational when the main chip fails.

One or more embodiments advantageously operate the backup chips, cores, and/or circuits at a very low AC frequency.

In one or more embodiments, this reduces the degradation in the backup chip from 15-75% without significantly increasing the power consumption of the system. Note that the reduction in degradation is not bounded by the above. Transistor and ring oscillator measurements show that NBTI and PBTI degradation is up to 75% less when a transistor is switching vs. undergoing a static stress. Therefore, for reliability purposes it would be better to switch the state of the transistors in the backup chips and/or cores. While operating the backups at full system frequency would drastically increase the power consumption of the system, transistor level measurements show that the switching benefit is independent of switching frequency even down to frequencies of milli-Hertz. Therefore, one or more embodiments operate the backup chip at a very low frequency that does not increase power consumption but provides reduced degradation levels.

Thus, in current technology, backup chips and/or cores are running at DC waiting to be called upon; this DC operation causes unacceptable BTI degradation. One or more embodiments address this issue by operating the backup chips and/or cores at low frequency AC. Embodiments can be implemented, for example, in microcode or in firmware. Some instances run with a built-in state machine, such that operation is autonomous. In some instances, if in standby mode, run low-frequency tests. In one or more embodiments, this can be implemented via modifying control software. With regard to built-in self-test (BIST), an overall system controller can be designed which runs some input patterns at a low frequency. Changes in microcode, software, and/or firmware are relatively easier to design and run. The backup chips or cores, which are in standby, are already running some basic kernel which is keeping devices and drivers activated. Microcode and/or software can be part of this kernel. The frequency of operation can be actively controlled by software. In a normal computer, frequency is varied several times based on what kind of programs the user is running. For example, frequency is lowered to save power when no high performance software is running. In general, it is not possible to guarantee that a given test program will cause all the devices to flip. One or more embodiments instead seek to employ patterns which exercise the maximum of devices. In a simpler chip, it may be possible to exercise all devices whereas in complex processors it may be that the critical devices in critical circuit paths are exercised.

Non-limiting exemplary configurations will be described with respect to FIGS. 3 and 4. It is to be emphasized that these are but non-limiting exemplary embodiments, and aspects of the invention are believed to be generally applicable wherever a chip and/or core of a multi-chip and/or multi-core system needs to be maintained in a back-up or standby mode such that it can rapidly take over for a failed chip and/or core, and/or rapidly begin processing in response to a higher work load, while limiting undesirable effects of BTI.

Figure 3:
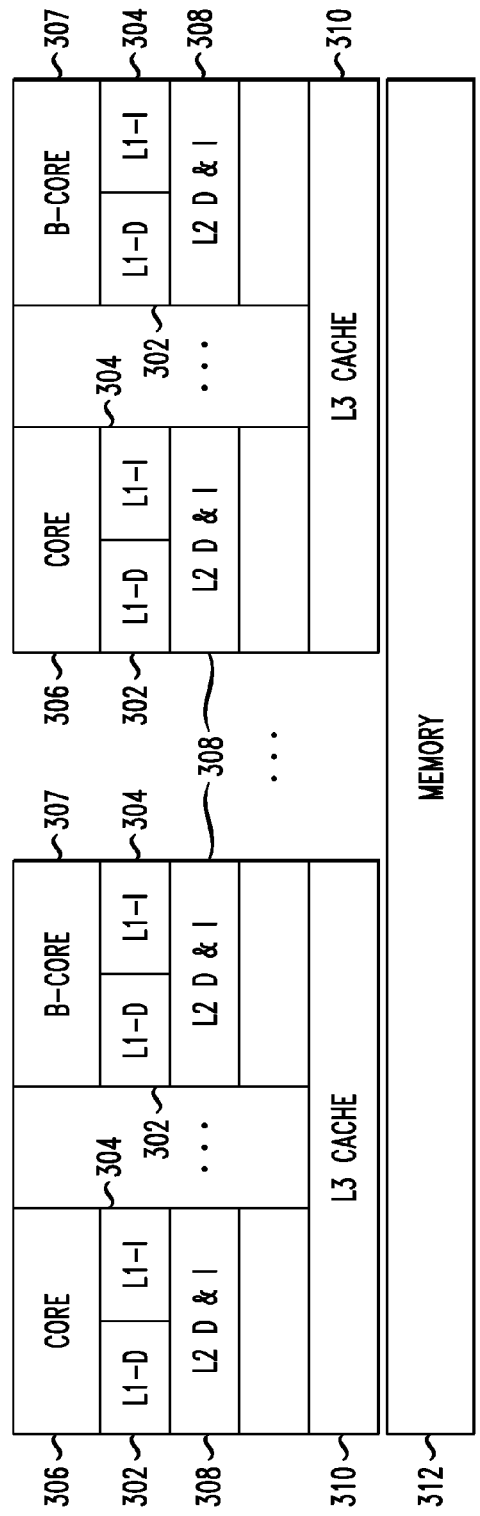
FIG. 3 shows memory and cache hierarchy of a modern multi-core system, which represents a non-limiting example of a system wherein one or more embodiments can be implemented.

FIG. 3 depicts a typical hierarchy of memory and cache of a modern multi-core system. Note L1 caches for data 302 and instructions 304; cores 306; backup or standby cores ("B-CORE") 307; L2 data and instruction caches 308; L3 caches 310; and memory 312. The access latency for instructions (labeled i in FIG. 3) and data (labeled 'D' in FIG. 3) increases from L1 cache to L2 cache to L3 cache to memory. In accordance with embodiments of the invention, B-COREs 307 have built-in test patterns that cause B-COREs 307 to undergo low-frequency AC operation while in backup or standby mode, and/or memory 312 contains instructions (loaded therein, for example, from persistent storage, not shown in FIG. 3) which cause B-COREs 307 to undergo low-frequency AC operation while in backup or standby mode. There are several well-known methods to control the clock frequency. See, for example, U.S. Pat. No. 7,515,666 B2 of Milton et al., "Method for dynamically changing the frequency of clock signals," the complete disclosure of which is expressly incorporated by reference herein in its entirety for all purposes, and the section on dynamic frequency change in the Wikipedia article "Clock signal," also expressly incorporated herein by reference in its entirety for all purposes.

Figure 4:
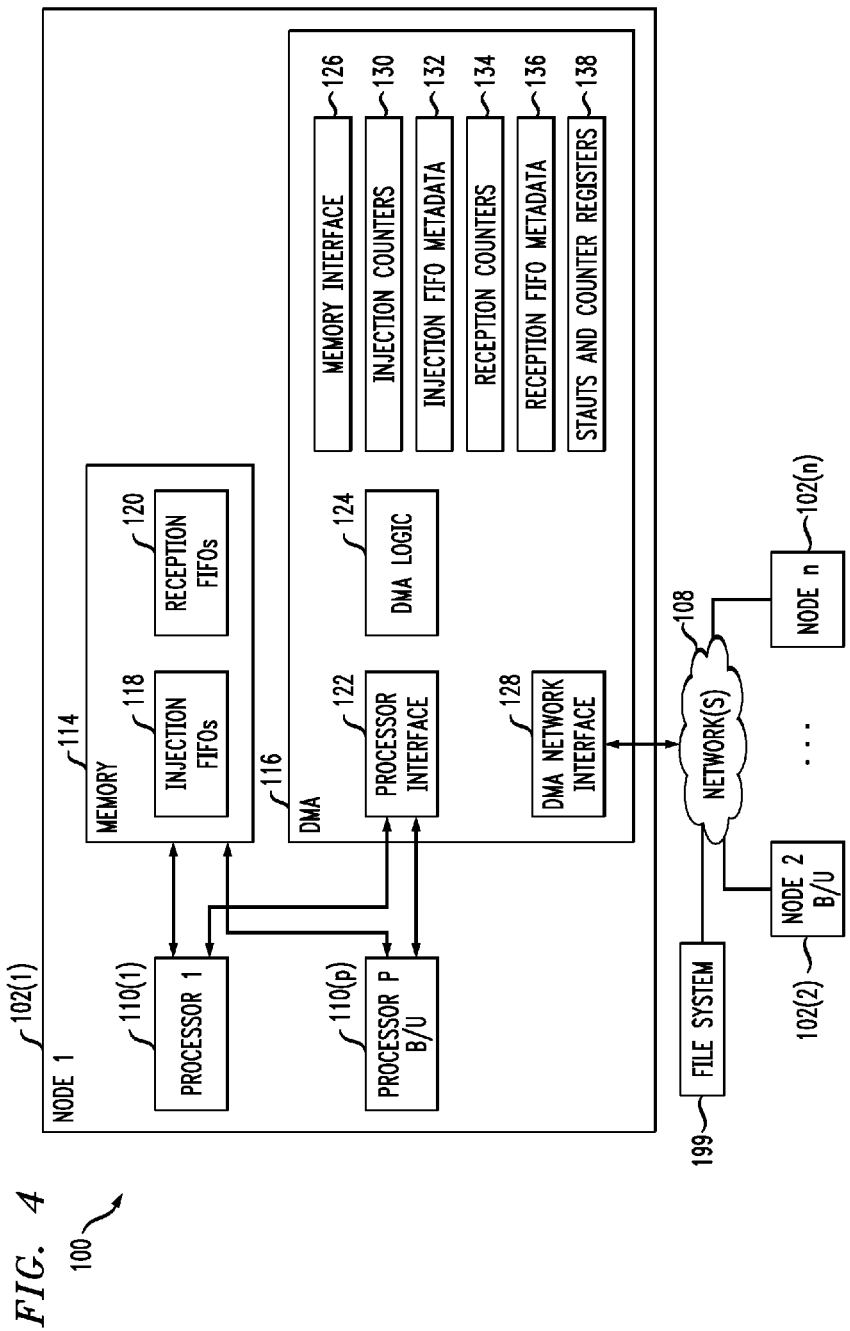
FIG. 4 shows a schematic block diagram of a parallel computer system, which represents a non-limiting example of a system wherein one or more embodiments can be implemented.

FIG. 4 is a schematic block diagram illustrating an exemplary parallel computer system 100 employing aspects of the invention. Parallel computer system 100 includes a plurality of individual compute nodes 102(1), 102(2) . . . 102(n), which may, for example, be constructed as single application specific integrated circuits (ASICs) and interconnected across network 108. FIG. 4 highlights a preferred construction of one of the compute nodes, ASIC 102(1). Each of the exemplary' compute nodes (102(n)) is fabricated to integrate all the functions of a computer into a single compute ASIC to enable a dramatic reduction in node size and power consumption. In a supercomputer, or parallel computer system, the reduced node size and its lower power consumption provides for increased node density, thereby decreasing the overall cost per unit performance for the parallel computer system (100). It is to be emphasized that the configuration of FIG. 4 is exemplary and non-limiting in nature.

Compute node or ASIC 102(1) may function as both a compute node and an input/output (I/O) node in the parallel computer system 100. Compute node 102(1) includes a plurality of processors or processor cores, 110(1) . . . 110(p), but preferably four. Each of the processor cores 110 can include, for example, a "double" floating point unit, which may in turn include two coupled standard floating point units. This arrangement gives a peak performance of four floating point operations per processor core per clock cycle.

Besides the embedded processor cores 110, and floating point cores (not shown in FIG. 4), each node 102 of the parallel computer system 100 includes a DMA, or DMA engine 116 (DMA and DMA engine are used interchangeably herein), and a memory 114 such as, for example, an embedded dynamic random access memory (DRAM). DRAM 114 includes injection FIFOs 118 and reception FIFOs 120, and can be controlled, for example, by an integrated external DDR2 (double data rate synchronous dynamic random access memory interface) memory controller (not shown in FIG. 1)

and DMA engine 116. DMA engine 116 includes processor interface 122, DMA logic 124, memory interface 126, DMA network interface 128, injection counters 130, injection FIFO metadata 132, reception counters 134, reception FIFO metadata 136 and status and control registers 138. The injection FIFO metadata 132 describes where in memory 114 the injection FIFOs 118 are located and the current head and tail of the FIFOs. The reception FIFO metadata 136 describes where in memory the reception FIFOs 120 are located, and the current head and tail of the FIFOs. Particularly in a system-on-a-chip implementation, the amount of logic area devoted to the DMA engine may be quite limited, and thus the number of counters may be relatively small. Effective sharing of counters between multiple messages may thus be desirable.

DMA engine 116 directly controls transfer of long messages, which long messages are typically preceded by short protocol messages deposited into reception FIFOs on a receiving node (for example, a reception FIFO 120 in memory 114 of compute node 102(2)). Through these protocol messages, the sender, source or origin compute nodes, and the receiver, target or destination compute nodes agree on which injection counter (130) and reception counter (134) identifications to use for message passing, and what the base offsets are for the messages being processed. Long message transfer may be initiated by a core processor on the sender node by placing a "put" message descriptor into an injection FIFO 118 (in memory 114), writing the injection counter base and value via writes via the DMA engine's memory interface 126, and appropriately modifying the injection FIFO metadata 132 for the injection FIFO containing that message. This includes advancing a tail pointer indicating the "last" message descriptor in the injection FIFO via a "write" to the DMA processor interface DMA logic 124 reads the injection FIFO metadata 132, and recognizes which injection FIFOs have messages to be sent.

The DMA logic causes the DMA memory interface 126 to read the descriptor in an injection FIFO 118 (in memory 114). The put message descriptor includes the injection (130) and reception counter (134) identifications to be used, the message length, the initial injection and reception offsets of the message, the destination node and other network routing information. The DMA engine 116 begins fetching the message and assembling it into packets to be "put" on to the network 108. Each packet contains an offset from the reception counter 134 where the data from this packet is to be stored, and a count of how many bytes in this packet should be written. DMA engine 116 is responsible for updating this information correctly for each packet, and puts the packets into the DMA network interface 128 (when space is available), at which time the packet enters the network and is routed to the destination compute node (for example, compute node(n)).

After DMA engine 116 puts the message in the DMA network interface 128, it decrements the specified injection counter 130 by the number of bytes in the packet. Upon reaching the destination, the packet is put into the DMA network interface at that compute node (e.g., 102(n)), and the target node's DMA engine "recognizes" that the packet is there. The DMA engine at the receiver or target compute node reads the reception counter identification, offset and count from the received packet, looks up the reception counter base address, writes the appropriate number of bytes starting at the base plus packet offset, and then decrements the counter value by the bytes.

If a remote get operation is used, instead of the processor on the sender node injecting a descriptor into the Injection FIFO 118, the receiver node sends a short get message (which contains a put descriptor) to the sender compute node (e.g., 102(n)), and the DMA logic at the sender compute node puts this descriptor into the Injection FIFO and advances that FIFO's data appropriately. To share a byte counter, the base address of the shared counter must be set to a value smaller than the base address of any message to be using that counter. The initial value of the counter is set to zero. The initial offset in a message descriptor is the message's starting address minus this base offset. The particular processor increments the counter value by the current message length, and in accordance with the novel operation, the processor need only know the current message length, but not the lengths of the other messages using this counter, nor the number of bytes that have already been received. The reader should note that the byte counter can be shared between messages even if the messages come from different source (sender) nodes.

Network 108 preferably displays a 10 gigabit Ethernet functionality, providing all the network link cut-through routing buffers and routing control block that allows any two nodes to communicate with low latency. The four (or "p") processor cores embedded in ASIC (node 102(1)) as shown may be utilized for message handling and computation operations. Virtual cut-through torus routing may be supported in a hardware block, which is integrated into the compute nodes 102 to allow for the elimination of the network adapter, typically required in conventional parallel computer system operation. Preferably, a virtual channel routing network is supported with two (2) dynamic and two (2) deterministic channels.

The same compute node ASIC construction 102 can also be used as an I/O node, which is associated with a subset of the compute nodes (e.g., 16, 32, 64, or 128 compute nodes), for handling fileserver communication and I/O operations. In some embodiments, the only difference between an I/O compute node and a computation compute node is that an I/O node enables and uses an external network interface, such as the 10 Gigabit Ethernet. While the compute nodes may have the integrated 10 gigabit Ethernet (they share a common ASIC), for purposes of discussion, the 10 gigabit Ethernet interface is enabled at the I/O nodes only.

The network 108 of interconnected compute nodes 102 effectively operates a global message-passing application for performing communications across the network, in that each of the compute nodes 102 includes one or more individual processors 110 with memories which run local instances of the global message-passing application. The nodes 102 may be connected by multiple networks; for example, torus network 108, a collective network (not shown), and a global asynchronous network (not shown), as known from US Patent Publication 2009/0006296 and US Patent Publication 2011/0010471.

In accordance with embodiments of the invention, some processors with a node (e.g., processor P it Node 1) are operating in a backup ("B/U") or standby mode, and such processers have built-in test patterns that cause them to undergo low-frequency AC operation while in backup or standby mode, and/or persistent storage (e.g., file system 199 coupled to network(s) 108) has instructions which, when loaded into memory accessible to processor P cause processor P to undergo low-frequency AC operation while in backup or standby mode. Non-limiting exemplary techniques for frequency control have been discussed above. In addition to backup or standby processor P, or in lieu thereof, in accordance with other embodiments of the invention, some nodes (e.g., Node 2) are operating in a backup ("WU") or standby mode, and (all) processors of such nodes have built-in test patterns that cause them to undergo low-frequency AC operation while in backup or standby mode, and/or persistent storage 199 has instructions which, when loaded into memory accessible to processors of such nodes cause (all) processors of such nodes to undergo low-frequency AC operation while in backup or standby mode. Again, non-limiting exemplary techniques for frequency control have been discussed above.

Overall, it is desirable to operate at low frequency, but it is only necessary to go down in frequency such that the active power is negligible. In some embodiments, this will be about 1-10% of normal operating frequency. Thus, it would be possible to operate anywhere from millihertz (mHz) up to 1-10% of operating frequency.

Figure 5:
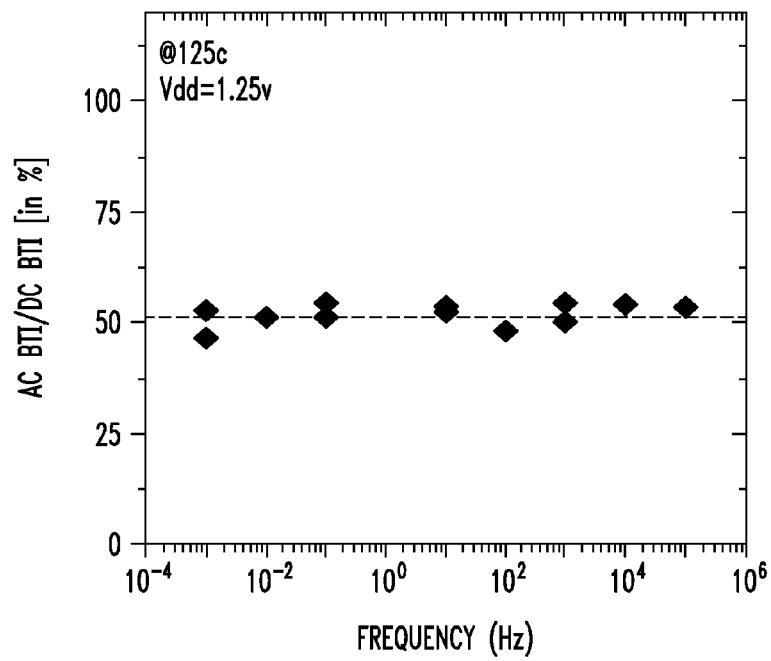
FIG. 5 is a graph showing the shift in BTI (bias temperature instability) under AC conditions (with 50% duty cycle) as opposed to DC conditions (ratio of AC BTI to DC BTI)

FIG. 5 shows the ratio of AC BTI to DC BTI for a wide range of AC frequencies. Duty cycle is 50% for AC cases. As can be seen therein from the dashed line, the ratio is approximately 50% over a very wide range of AC frequencies, from $10^{-4}$ Hz to $10^6$ Hz. The non-limiting example in FIG. 5 was for operation at Vdd=1.25 V and 125° C. Thus, over a very wide range of frequencies, BTI degradation under AC conditions is only about 50% as bad as would be expected under DC conditions. Energy is dissipated in processors both by the action of the switching devices (transistors) and by the energy lost in the form of heat due to the impedance of the electronic circuits. As the frequency (clock rate) is increased, the switching devices switch more frequently and thus dissipate more heat. Therefore, since the anti-degradation effects of AC operation can be achieved at very low frequencies, it is desirable to operate the backup chips and/or cores at very low frequencies to obtain the anti-degradation effects with little impact on overall power consumption.

Figure 6:
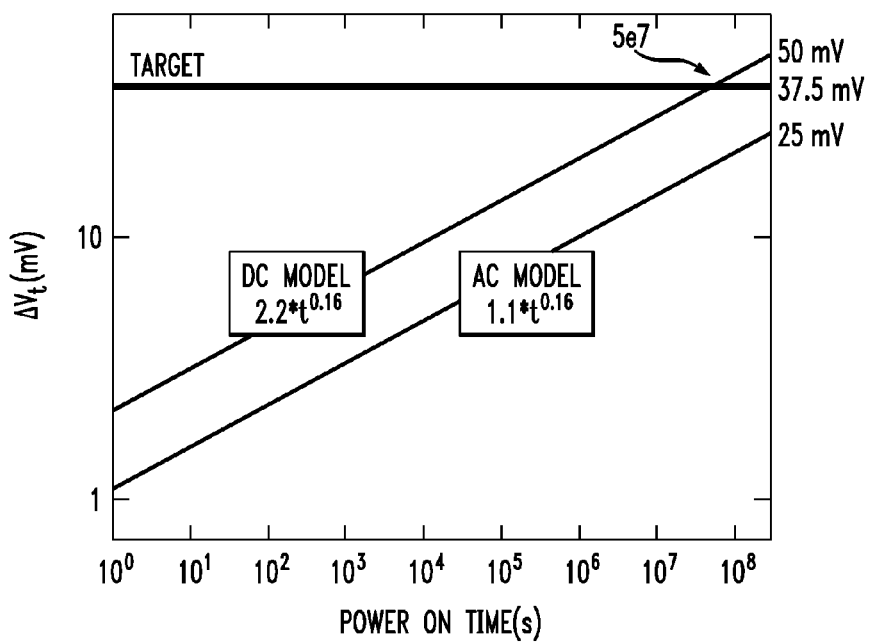
FIG. 6 is a graph comparing the change in threshold voltage with power-on time for DC and AC conditions, wherein a curve for DC operation exceeds a failure threshold.

FIG. 6 shows how an embodiment of the invention can be used to prevent failure that would otherwise occur. The change in threshold voltage due to BTI is plotted against the power-on time, t, on a log-log scale. The predicted degradation under DC conditions is $2.2t^{0.16}$, whereas that for AC is $1.1t^{0.16}$, only about half that at DC. The target maximum degradation is 37.5 mV. The AC curve remains below this threshold of failure through the power-on times of interest. However, the DC curve crosses the failure threshold at a power on time of about $5 \times 10^7$ seconds. Now the backup chip will follow AC curve since it is running in AC mode during standby, and then operating in AC mode when it is called upon for calculation. It is to be emphasized that this figure is just an example, and would be valid for other targets besides 37.5 mV and for different amounts of degradation. It is simply illustrative. This figure assumes a 50% AC/DC factor from FIG. 5.

It will be appreciated that that there are AC and DC equilibrium states. If a chip is in a, say, AC state and is not switched for some time, it will go to the DC equilibrium state. This illustrates that the DC state is undesirable any time; whether it is from the beginning of deploying a chip at a customer location or if the chip starts seeing the DC state after some time.

Embodiments of the invention can be implemented, for example, at software level by running some pre-coded workload on backup chips and/or cores. Other embodiments can be implemented at hardware level by having the hardware manufacturer modify the hardware design and code-in test patterns to run in the backup chips at a tow enough frequency such that power consumption is not significantly increased.

The goal of the test patterns is such that every field effect transistor (FET) in a chip and/or core has its state switched periodically.

FIG. 7 shows some possible ways of implementing one or more embodiments. In general, the goal, as per 902, is to run the backup cores and/or chips at very low frequencies, on the order of milli-Hertz, and at their normal operating voltages.

The three components of the chips which typically need to be active are the clock trees 904, the logic circuits 906, and the on-chip memory 908. In present systems, the clocks are operating at high frequencies, as indicated at 910, but in one or more embodiments, as indicated at 912, they could operate at much lower frequency and achieve the same reduction in degradation. All the transistors in the clock tree are thereby switched periodically, so as to reduce degradation to acceptable levels.

There are many ways in which the chip logic 906 could be exercised at low frequency. As indicated at 914, currently, the logic is subject to DC and the transistors do not switch but remain in the same state. The aim in one or more embodiments, as per 916, is to have every logic gate switch occasionally. One way to do this is to run example customer work loads. Another is to run the structured test patterns which are used at test time to provide high fault coverage. Such test patterns are believed advantageous in one or more embodiments as their intent is to operate every logic gate in the core. Other techniques for switching every gate are possible.

For on-chip memory 908, such as static random access memory (SRAM), currently, as per 918, the transistors in the memory do not switch but remain in the same state. In one or more embodiments, as per 920, either stored test patterns can be applied, as in logic test, or conventional ABIST (array built-in self-test) state machines can be used. ABIST state machine intentionally read and write to every memory cell in a pre-determined order, thus achieving the coverage employed in one or more embodiments.

In one or more embodiments, clock trees, logic circuits, and memory are, in and of themselves, conventional.

It should be noted that one or more embodiments seek to reduce degradation by eliminating the static stress situation by operating chips and/or cores in backup and/or standby mode at low frequency AC rather than DC. Thus, one or more embodiments do not necessarily seek to control the temperature of such chips and/or cores in backup and/or standby mode (although techniques of the invention could, in some cases, be used in conjunction with such temperature control techniques).

Given the discussion thus far, it will, be appreciated that, in general terms, an exemplary method of operating a system having at least a first circuit portion and a second circuit portion, according to an aspect of the invention, includes operating the first circuit portion (e.g., core 306 or processor 110(1)) at normal AC frequency; and operating the second circuit portion (e.g., core 307 or processor 110(p) or any of the processors in Node 2 102(2)) in a back-up mode, at low AC frequency, such that the second processor can rapidly come-online but has limited temperature bias instability degradation.

A number of configurations are possible; for example, a single chip with multiple cores, one or more of which are running and one or more of which are in stand-by mode; or a running chip or chips and a back-up chip or chips, for example.

In some cases, the step of operating the second circuit portion at the low AC frequency includes operating the second circuit portion in a range from 1 Hertz to ten percent of the normal AC frequency. As used herein, "normal AC frequency" is the frequency the circuit is designed to operate at when in a normal mode and not a standby mode. By way of a non-limiting example, this value might be approximately 2-5 GHz for current high-end circuitry or several hundred MHz for current lower-end circuitry. Again, these values are non-limiting; future chips might be faster, for example. As used herein, "normal operating voltage" is the voltage the circuit is designed to operate at when in a normal mode and not a standby mode. In one or more embodiments using current circuits, normal operating voltage is approximately 0.8-1.3 V. Again, these values are not intended to limit the claims unless expressly recited therein, as other embodiments could use different frequencies or voltages. As used herein, "low AC frequency" means a frequency that is sufficiently low such that active power is negligible but temperature instability effect is usefully reduced. The following are non-limiting exemplary ranges useful in one or more embodiments:

- millihertz up to no more than 10% of normal operating frequency
- millihertz up to no more than 4-5% of normal operating frequency
- 1 Hz up to no more than 10% of normal operating frequency
- 1 Hz up to no more than 4-5% of normal operating frequency In a broad aspect, low AC frequency does not have a theoretical lower bound. For example, if operating at 0.0001 Hz (or a period of 10000 seconds), with 50% duty cycle, the circuits will be switching every 5000 sec or approx. 1.5 hrs. On the other hand, operating at 1% duty cycle will cause signals to be high for 100 s and low for 9900 s. Duty cycle can also be varied using microcode, software, and/or firmware. This is still quite low in comparison to the duration for which backup chips may be degrading, which can be in terms of months and years.

In one or more embodiments, the first circuit portion operates at normal operating voltage. In one or more embodiments, the second circuit portion operates at normal operating voltage; in other embodiments, the second circuit portion operates at a voltage other than normal operating voltage.

In some cases, an additional step includes bringing the second circuit portion on-line and operating the second circuit portion at normal AC frequency (e.g., activate core 307 or processor 110(p) or Node 2 102(2)).

In some instances, the step of operating the second circuit portion in the back-up mode includes running a hardware built-in-self-test pattern at the low AC frequency.

In some cases, the step of operating the second circuit portion in the back-up mode includes executing a program on the second circuit portion at the low AC frequency.

In some cases, the step of operating the first circuit portion at normal AC frequency includes operating the first circuit portion in a range from two to five GHz.

In some embodiments, a further step includes providing an integrated circuit chip with multiple processor cores, wherein the first circuit portion is a first one of the processor cores and the second circuit portion is a second one of the processor cores.

In some instances, a further step includes providing a first integrated circuit chip and a second integrated circuit chip, wherein the first integrated circuit chip is the first circuit portion and the second integrated circuit chip is the second circuit portion.

Further, in some embodiments, a further step includes providing a system, wherein the system includes a distinct control software module embodied, in a non-transitory manner, on a storage medium, and wherein the steps of operating the first and second circuit portions are controlled by executing the control software module on at least one hardware processor. The storage medium could be, for example, BIOS flash read-only memory. This is a non-limiting example; other instances could include direct control as part of the operating system.

In another aspect, an exemplary system includes a first circuit portion as described above and a second circuit portion as described above. Also included is a control unit. The control unit is configured to cause the first circuit portion to operate at normal AC frequency; and cause the second circuit portion to operate in a back-up mode at low AC frequency, such that the second circuit portion can rapidly come-online but has limited temperature bias instability degradation.

In some cases, the low AC frequency is in a range from 1 Hertz to ten percent of the normal AC frequency.

In some embodiments, the control unit is further configured to bring the second circuit portion on-line and to operate the second circuit portion at the normal AC frequency.

In some cases, the second circuit portion, in the back-up mode, runs a hardware built-in-self-test pattern at the low AC frequency.

In some instances, the second circuit portion, in the back-up mode, executes a program at the low AC frequency.

In general, some embodiments trigger BIST with control software; in other embodiments, the control software includes a test pattern it causes the second circuit portion to run.

In a non-limiting example, the normal AC frequency includes a range from two to five GHz.

As noted, in some cases, at least a portion of the system includes an integrated circuit chip with multiple processor cores, the first circuit portion includes a first one of the processor cores, and the second circuit portion includes a second one of the processor cores.

As also noted, in some instances, the system includes at least a first integrated circuit chip and a second integrated circuit chip, the first integrated circuit chip includes the first circuit portion and the second integrated circuit chip comprises the second circuit portion.

The control unit can be implemented, for example, a distinct control software module embodied, in a non-transitory manner, on a storage medium, and executable on at least one hardware processor. The at least one hardware processor could be the first circuit portion, the second circuit portion, and/or a different circuit portion. In some cases, the storage medium includes BIOS flash read-only memory (on-chip).

Exemplary Design Structure Details

Figure 9:
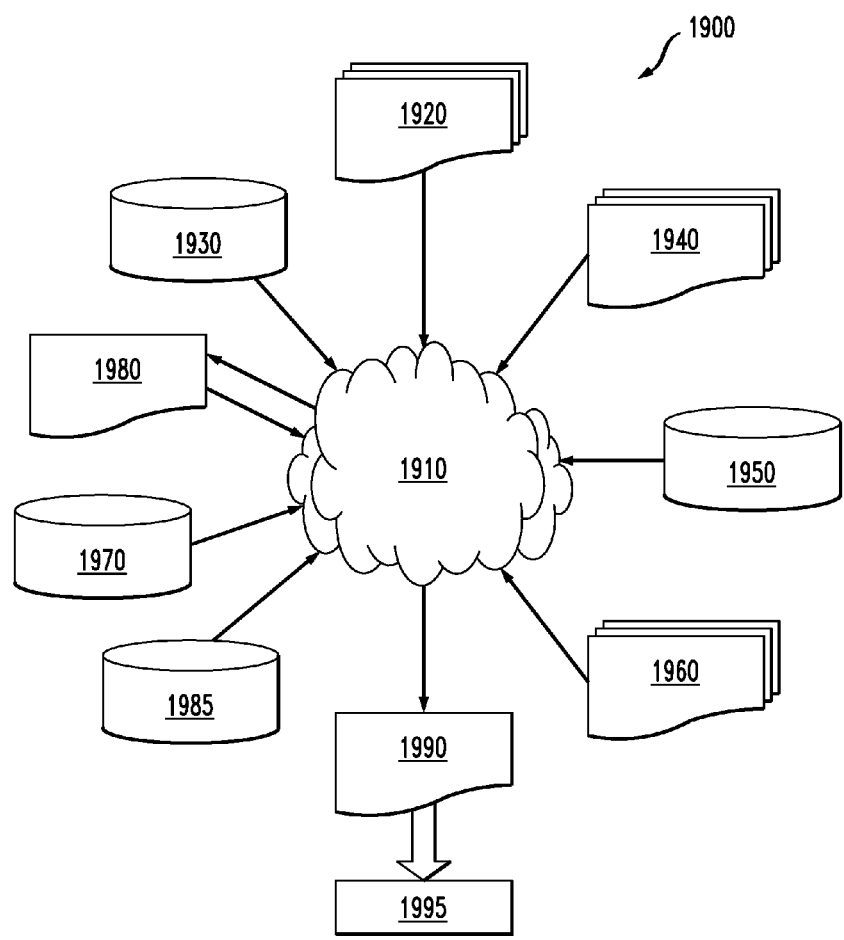
FIG. 9 is a flow diagram of a design process used in semiconductor design, manufacture, and/or test.

FIG. 9 shows a block diagram of an exemplary design flow 1900 used for example, in semiconductor IC logic design, simulation, test, layout, and manufacture. Design flow 1900 includes processes, machines and/or mechanisms for processing design structures or devices to generate logically or otherwise functionally equivalent representations of the design structures and/or devices described above (such as enhanced BIST circuitry that provide better control of clock trees, memories, and/or logic circuits; i.e., to make sure BIST gives full coverage and access to each and every unit or core). The design structures processed and/or generated by design flow 1900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium.

Design flow 1900 may vary depending on the type of representation being designed. For example, a design flow 1900 for building an application specific IC (ASIC) may differ from a design flow 1900 for designing a standard component or from a design flow 1900 for instantiating the design into a programmable array, for example a programmable gate array (PGA) or a field programmable gate array (FPGA) offered by Altera® Inc. or Xilinx® Inc.

FIG. 9 illustrates multiple such design structures including an input design structure 1920 that is preferably processed by a design process 1910. Design structure 1920 may be a logical simulation design structure generated and processed by design process 1910 to produce a logically equivalent functional representation of a hardware device. Design structure 1920 may also or alternatively comprise data and/or program instructions that when processed by design process 1910, generate a functional representation of the physical structure of a hardware device. Whether representing functional and/or structural design features, design structure 1920 may be generated using electronic computer-aided design (ECAD) such as implemented by a core developer/designer. When encoded on a machine-readable data transmission, gate array, or storage medium, design structure 1920 may be accessed and processed by one or more hardware and/or software modules within design process 1910 to simulate or otherwise functionally represent an electronic component, circuit, electronic or logic module, apparatus, device, or system such as enhanced BIST circuitry as described above. As such, design structure 1920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1910 preferably employs and incorporates hardware and/or software modules for synthesizing, translating, or otherwise processing a design/simulation functional equivalent of the components, circuits, devices, or logic structures, such as enhanced 131ST circuitry as described above, to generate a Netlist 1980 which may contain design structures such as design structure 1920. Netlist 1980 may comprise, for example, compiled or otherwise processed data structures representing a list of wires, discrete components, logic gates, control circuits, I/O devices, models, etc. that describes the connections to other elements and circuits in an integrated circuit design. Netlist 1980 may be synthesized using an iterative process in which netlist 1980 is resynthesized one or more times depending on design specifications and parameters for the device. As with other design structure types described herein, netlist 1980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1910 may include hardware and software modules for processing a variety of input data structure types including Netlist 1980. Such data structure types may reside, for example, within library elements 1930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1940, characterization data 1950, verification data 1960, design rules 1970, and test data files 1985 which may include input test patterns, output test results, and other testing information. Design process 1910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1910 without deviating from the scope and spirit of the invention. Design process 1910 may also include modules for performing standard circuit design processes such as timing analysis, verification, design rule checking, place and route operations, etc.

Design process 1910 employs and incorporates logic and physical design tools such as HDL compilers and simulation model build tools to process design structure 1920 together with some or all of the depicted supporting data structures along with any additional mechanical design or data (if applicable), to generate a second design structure 1990. Design structure 1990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1920, design structure 1990 preferably comprises one or more files, data structures, or other computer-encoded data or instructions that reside on transmission or data storage media and that when processed by an ECAD system generate a logically or otherwise functionally equivalent form of one or more of the embodiments of the invention such as enhanced BIST circuitry as described above. In one embodiment, design structure 1990 may comprise a compiled, executable HDL simulation model that functionally simulates the enhanced BIST circuitry as described above.

Design structure 1990 may also employ a data format used for the exchange of layout data of integrated circuits and/or symbolic data format (e.g. information stored in a GDSII (GDS2), GL1, OASIS, map files, or any other suitable format for storing such design data structures). Design structure 1990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure such as enhanced BIST circuitry as described above. Design structure 1990 may then proceed to a stage 1995 where, for example, design structure 1990: proceeds to tape-out, is released to manufacturing, is released to a mask house, is sent to another design house, is sent back to the customer, etc.

Exemplary System and Article of Manufacture Details

As will be appreciated by one skilled in the art, aspects of the present invention may be embodied as a system, method or computer program product (e.g., control software). Furthermore, aspects of the present invention may take the form of a computer program product embodied in one or more computer readable medium(s) having computer readable program code embodied thereon.

Portions of one or more embodiments of the invention can be implemented in the form of an apparatus including a memory and at least one processor that is coupled to the memory and operative to perform or otherwise facilitate exemplary method steps.

One or more embodiments can make use of software running on a general purpose computer or workstation. With reference to FIG. 8, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1002, memory 1004, and input/output interface such as display 1006 and keyboard 1008 can he interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1012 as shown in FIG. 8) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1018 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 1002. Further, a computer program product can include a computer-readable storage medium with code adapted to be implemented to carry out one or more method steps described herein, including the provision of the system with the distinct software modules. As noted, in some instances, aspects of the invention are implemented in control software stored in a built-in BIOS flash ROM.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating a system having at least a first circuit portion and a second circuit portion, said method comprising the steps of:

operating said first circuit portion at normal clock frequency;

operating said second circuit portion in a back-up mode at low clock frequency while said first circuit portion operates at said normal clock frequency, such that said second circuit portion can rapidly come-online but has limited temperature bias instability degradation;

wherein said step of operating said second circuit portion at said low clock frequency comprises operating said second circuit portion in a range from 1 Hertz to ten percent of said normal clock frequency; and bringing said second circuit portion on-line and operating said second circuit portion at said normal clock frequency within a few clock cycles of at least one of failure of said first circuit portion and a spike in workload;

wherein said step of operating said second circuit portion in said back-up mode comprises running a hardware built-in-self-test pattern at said low clock frequency to exercise at least critical devices in critical circuit paths of said second circuit portion to achieve said limited temperature bias instability degradation.

2. The method of claim 1, wherein said step of operating said first circuit portion at normal clock frequency comprises operating said first circuit portion in a range from two to five GHz.

3. The method of claim 1, further comprising providing an integrated circuit chip with multiple processor cores, wherein said first circuit portion comprises a first one of said processor cores and said second circuit portion comprises a second one of said processor cores.

4. The method of claim 1, further comprising providing a first integrated circuit chip and a second integrated circuit chip, wherein said first integrated circuit chip comprises said first circuit portion and said second integrated circuit chip comprises said second circuit portion.

5. The method of claim 1, further comprising providing a system, wherein the system comprises a distinct control software module embodied, in a non-transitory manner, on a storage medium, and wherein said steps of operating said first and second circuit portions are controlled by executing said control software module on at least one hardware processor.

6. The method of claim 5, wherein, in said step of providing said system, said storage medium comprises BIOS flash read-only memory.

7. A system comprising:
a first circuit portion;
a second circuit portion;
a control unit configured to:
 cause said first circuit portion to operate at normal clock frequency; and
 cause said second circuit portion to operate in a back-up mode at low clock frequency while said first circuit portion operates at said normal clock frequency, such that said second circuit portion can rapidly come-online but has limited temperature bias instability degradation;
wherein said low clock frequency comprises a range from 1 Hertz to ten percent of said normal clock frequency; and
said control unit is further configured to bring said second circuit portion on-line and to operate said second circuit portion at said normal clock frequency within a few clock cycles of at least one of failure of said first circuit portion and a spike in workload;
wherein said second circuit portion in said back-up mode runs a hardware built-in-self-test pattern at said low clock frequency to exercise at least critical devices in critical circuit paths of said second circuit portion to achieve said limited temperature bias instability degradation.

8. The system of claim 7, wherein said normal clock frequency comprises a range from two to five GHz.

9. The system of claim 7, wherein at least a portion of said system comprises an integrated circuit chip with multiple processor cores, and wherein said first circuit portion comprises a first one of said processor cores and said second circuit portion comprises a second one of said processor cores.

10. The system of claim 7, wherein said system comprises at least a first integrated circuit chip and a second integrated circuit chip, and wherein said first integrated circuit chip comprises said first circuit portion and said second integrated circuit chip comprises said second circuit portion.

11. The system of claim 7, wherein said control unit comprises a distinct control software module embodied, in a non-transitory manner, on a storage medium, and executable on at least one hardware processor.

12. The system of claim 11, wherein said storage medium comprises BIOS flash read-only memory.

13. An apparatus for operating a system having at least a first circuit portion and a second circuit portion, said apparatus comprising:
means for operating said first circuit portion at normal clock frequency;
means for operating said second circuit portion in a back-up mode at low clock frequency while said first circuit portion operates at said normal clock frequency, such that said second circuit portion can rapidly come-online but has limited temperature bias instability degradation;
wherein said means for operating said second circuit portion at said low clock frequency comprise means for operating said second circuit portion in a range from 1 Hertz to ten percent of said normal clock frequency; and
means for bringing said second circuit portion on-line and operating said second circuit portion at said normal clock frequency within a few clock cycles of at least one of failure of said first circuit portion and a spike in workload;
wherein said means for operating said second circuit portion in said back-up mode comprise means for running a hardware built-in-self-test pattern at said low clock frequency to exercise at least critical devices in critical circuit paths of said second circuit portion to achieve said limited temperature bias instability degradation.

14. A computer program product for operating a system having at least a first circuit portion and a second circuit portion, said computer program product comprising a non-transitory computer readable storage medium having computer readable program code embodied therewith, said computer readable program code comprising:
computer readable program code configured to cause said first circuit portion to operate at normal clock frequency;
computer readable program code configured to cause said second circuit portion to operate in a back-up mode at low clock frequency while said first circuit portion operates at said normal clock frequency, such that said second circuit portion can rapidly come-online but has limited temperature bias instability degradation;
wherein said low clock frequency comprises a range from 1 Hertz to ten percent of said normal clock frequency; and
computer readable program code configured to bring said second circuit portion on-line and to operate said second circuit portion at said normal clock frequency within a few clock cycles of at least one of failure of said first circuit portion and a spike in workload;
wherein said second circuit portion in said back-up mode runs a hardware built-in-self-test pattern at said low clock frequency to exercise at least critical devices in critical circuit paths of said second circuit portion to achieve said limited temperature bias instability degradation.

* * * * *